United States Patent [19]

Sugawara

[11] Patent Number: 5,289,991
[45] Date of Patent: Mar. 1, 1994

[54] SPINNING REEL

[75] Inventor: Kenichi Sugawara, Sakai, Japan

[73] Assignee: Shimano Inc., Osaka, Japan

[21] Appl. No.: 974,367

[22] Filed: Nov. 10, 1992

Related U.S. Application Data

[63] Continuation of Ser. No. 724,137, Jul. 1, 1991, abandoned.

[30] Foreign Application Priority Data

Jul. 4, 1990 [JP] Japan .................. 2-71852[U]

[51] Int. Cl.⁵ .......................................... A01K 89/027
[52] U.S. Cl. ..................................................... 242/245
[58] Field of Search ........................ 242/244, 245, 246

[56] References Cited

U.S. PATENT DOCUMENTS

| | | | |
|---|---|---|---|
| 3,322,371 | 5/1967 | Rouanet | 242/244 |
| 4,238,085 | 12/1980 | Jansson et al. | 242/245 |
| 4,509,705 | 4/1985 | Councilman et al. | 242/245 |
| 4,572,448 | 2/1986 | Ban | 242/245 |
| 4,591,108 | 5/1986 | Ban | 242/245 |
| 4,634,073 | 1/1987 | Coquelet | 242/245 |
| 4,702,430 | 10/1987 | Saito | 242/245 |
| 4,725,012 | 2/1988 | Councilman | 242/245 |
| 4,746,077 | 5/1988 | Toda | 242/245 |
| 4,749,285 | 6/1988 | Noda | |
| 4,988,057 | 1/1991 | Hitomi | 242/245 |

FOREIGN PATENT DOCUMENTS

| | | |
|---|---|---|
| 20150061 | 1/1985 | European Pat. Off. . |
| 20181027 | 10/1985 | European Pat. Off. . |
| 63-29423 | 8/1988 | Japan . |
| 2181331A | 10/1986 | United Kingdom . |
| 2202721 | 5/1988 | United Kingdom . |

Primary Examiner—Katherine Matecki
Attorney, Agent, or Firm—Dickstein, Shapiro & Morin

[57] ABSTRACT

A spinning reel comprising a reel body, a spool mounted forwardly of the reel body, a drag mechanism mounted on a rear end portion of the reel body for applying a braking force to rotation of a spool shaft connected to the spool, and means for adjusting the braking force of the drag mechanism D having a first control element for determining a reference braking force and a second control element for varying the braking force. The first control element defines a connected portion, and the second control element has a connecting element switchable between a position engageable with the connected portion and a position disengaged from the connected portion.

7 Claims, 2 Drawing Sheets

SPINNING REEL

This application is a continuation of application Ser. No. 07/724,137 filed Jul. 1, 1991, now abandoned.

BACKGROUND OF THE INVENTION

1. Field of the Invention

The present invention relates to a spinning reel, and more particularly to a spinning reel comprising a reel body, a spool shaft connected to a spool mounted forwardly of the reel body, a drag mechanism mounted on a rear end of the reel body for applying a braking force to rotation of the spool shaft, and means for adjusting the braking force of the drag mechanism having a first control element for determining a reference braking force and a second control element for varying the braking force.

2. Description of the Related Art

An example of the spinning reel as noted above is shown in Japanese Utility Model Publication No. 63-29423. In this prior art, an adjusting system for adjusting the braking force of the drag mechanism includes a screw type mechanism and a cam type mechanism separately from each other. The first control element is attached to the screw type mechanism while the second control element is attached to the cam type mechanism. In order to adjust the braking force of the drag mechanism, the first control element is rotatable to determine the reference braking force while only the second control element is pivotable to rapidly vary the braking force when a fish bites.

In adjusting the braking force of the drag mechanism while fishing with the spinning reel of this type, the greater the amount of a fishing line fed from the spool, the smaller the winding diameter of the fishing line defined around the spool becomes, even if the braking force of the drag mechanism is constant. As a result, a tensile force of the fishing line capable of rotating the spool against the braking force of the drag mechanism becomes greater. Thus, when the amount of the fishing line fed from the spool becomes greater, it is desirable to decrease the braking force of the drag mechanism in order to reduce the possibility of breaking the fishing line.

For the purpose of decreasing the braking force of the drag mechanism with a feed-out amount of the fishing line, the second control element may be used. However, if the second control member is used for decreasing the braking force of the drag mechanism, it may possibly reach a limit when a fish bites and the angler tries to further decrease the braking force for "fighting" against the fish. This is disadvantageous in handling the reel.

In order to avoid such a problem, it is desirable to control the first control element as frequently as possible to set the reference braking force to a proper value. However, it is troublesome to individually operate the first and second control elements while fishing and concurrently the senses of operating these control elements are different, which requires an improvement in such a structure.

SUMMARY OF THE INVENTION

A primary object of the present invention is to provide an improved spinning reel in which a reference braking force of a drag mechanism can be readily determined without producing any different senses when operating two control elements, and in which the braking force of the drag mechanism can be changed to a proper value when a fish bites.

In order to achieve the object as noted above, a spinning reel according to the present invention with the drag mechanism for adjusting the braking force through the first and second control elements is characterized in that the first control element defines a connected portion while the second control element has a connecting element switchable between a position engaged with and a position disengaged from the connected portion.

This structure has the following functions and effects.

As shown in FIGS. 1 and 2, if it is desired to adjust the braking force of the drag mechanism D, e.g. when the amount of the fishing line fed from the spool 5 increases, the connecting element 15 is moved to a position engaged with the connected portion 13 thereby to interconnect the first control element 8 and the second control element 11 through the connecting element 15 and the connected portion 13. As a result, the reference braking force can be changed through an operation of the second control element 11. On the other hand, the connecting element 15 can be moved to a position disengaged from the connected portion 13 to enable one to quickly vary the braking force of the drag mechanism D only through an operation of the second control element 11 in a similar manner to the conventional art.

In sum, the present invention allows the reference braking force of the drag mechanism D to vary only through the second control element 11 without operating the first control element 8.

Therefore, the present invention can provide an improved spinning reel in which the reference braking force of the drag mechanism can be easily determined without giving the angular any different senses when operating two control elements, and in which the braking force of the drag mechanism can be changed to a proper value when a fish bites.

Other objects, features and advantages will be apparent from the following detailed description referring to the accompanying drawings.

BRIEF DESCRIPTION OF THE DRAWINGS

The drawings show spinning reels embodying the present invention, in which.

DETAILED DESCRIPTION OF THE PREFERRED EMBODIMENTS

Figure 1:
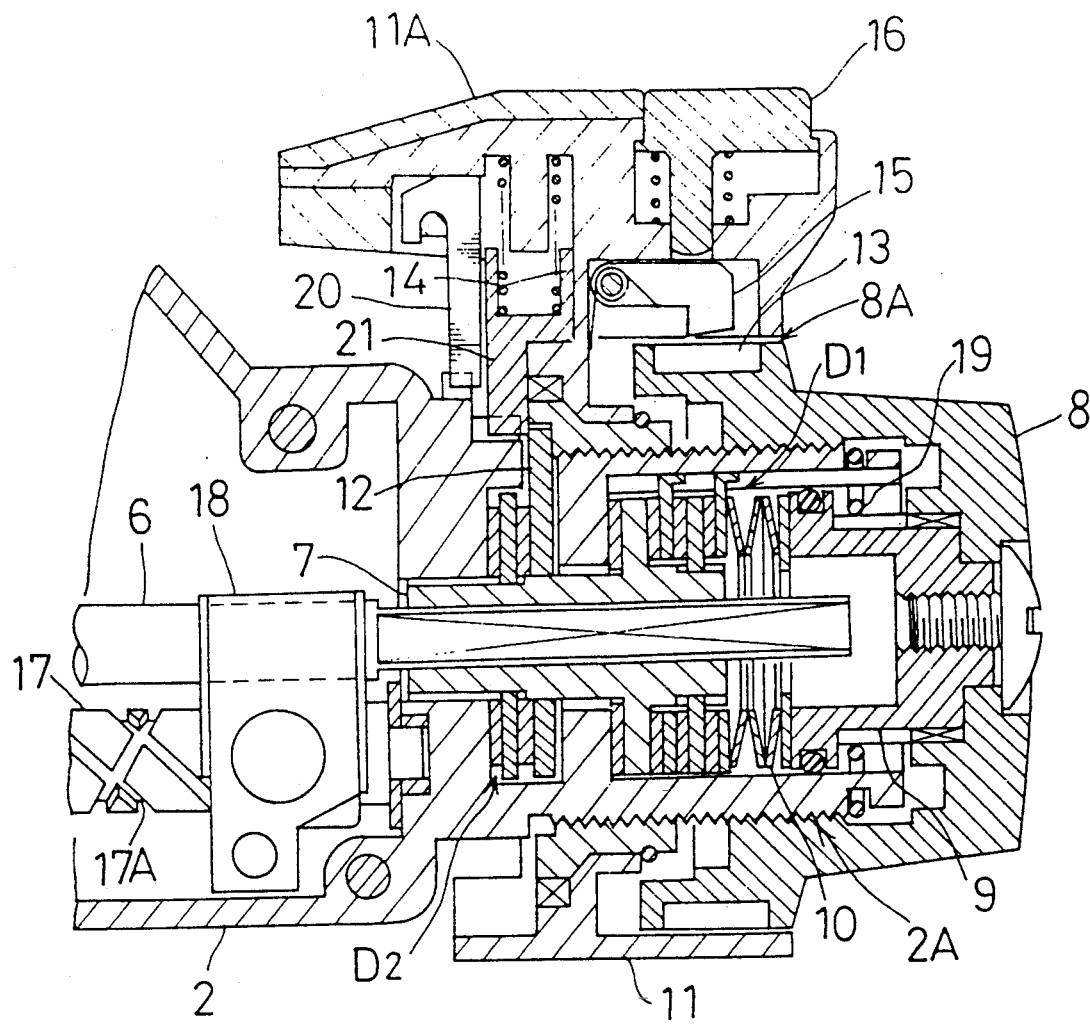
FIG. 1 is a fragmentary vertical section in side view of a drag mechanism of the spinning reel according to the present invention.

A spinning reel embodying the present invention will be described in detail referring to the drawings hereinafter.

Figure 3:
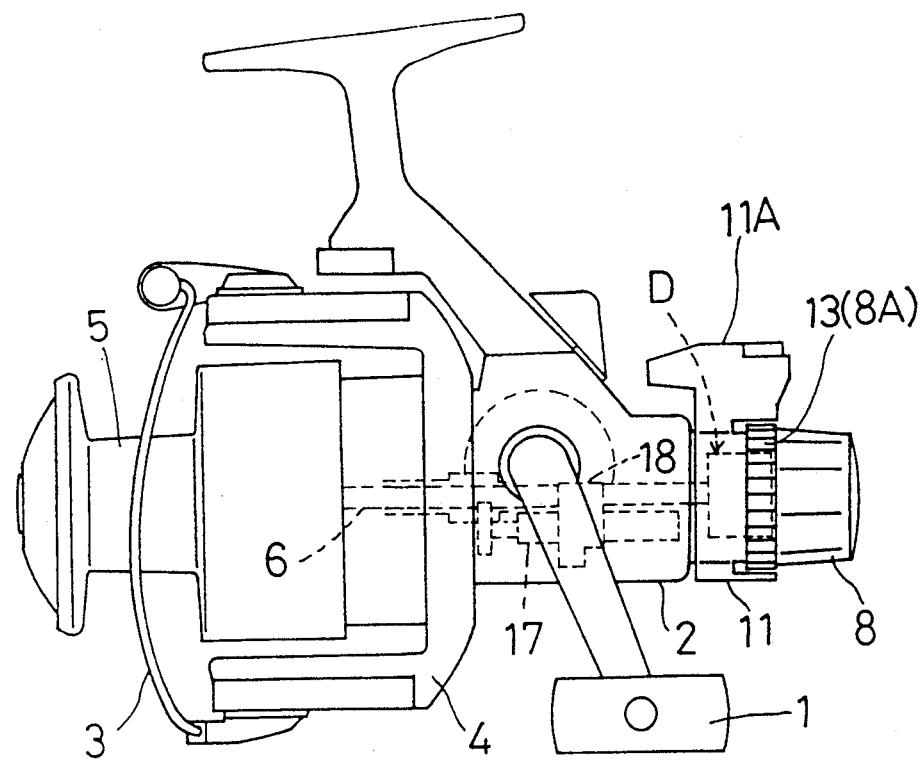
FIG. 3 is a side view of the spinning reel.

FIG. 3 shows a spinning reel comprising a reel body 2 having a handle 1. Forwardly of the reel body 2 are mounted a rotor 4 having a bail 3, and a spool 5. Rearwardly of the reel body 2 is mounted a drag mechanism D.

Figure 2:
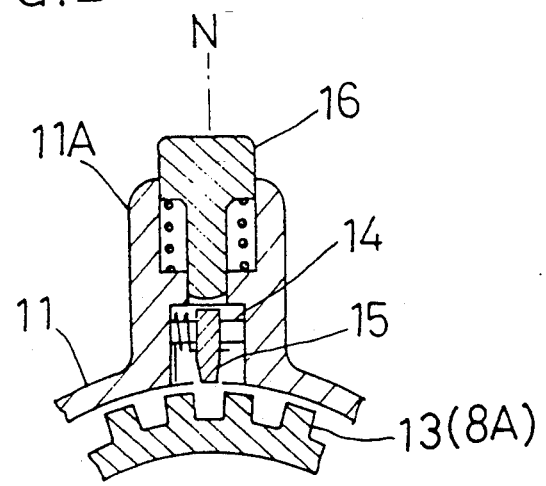
FIG. 2 is a fragmentary vertical section in front view of a connecting element, a knob, and the like of the spinning reel.

As shown in FIGS. 1 and 2, the drag mechanism D includes a sleeve 7 fitted on a rear end of a spool shaft 6 connected to the spool 5 for torque transmission, and a first group of disks D1 and second group of disks D2 fitted on the sleeve 7. The first group of disks D1 adjusts a pressure of a spring 10 through a first pressure element 9 by rotating a cap-like first control element 8 screwed to a threaded portion 2A defined in the reel body 2 to thereby adjust a braking force of the drag mechanism. The second group of disks D2 varies a position of a second pressure element 12 by oscillating a lever-like second control element 11 screwed to the threaded portion 2A thereby to adjust the braking force of the drag mechanism.

The first control element 8 of the drag mechanism D can be screwed to a limit of a stroke axially along the spool shaft 6. The second control element 11 has a lever portion 11A pivotable about a neutral position N in opposite directions approximately by 90°. During normal use, the first control element 8 is operable to determine a reference braking force while only the second control element 11 is operable to vary the braking force when a fish bites.

Also, with this reel, the reference braking force of the drag mechanism D can be varied by the second control element 11 while doing fishing without operating the first control element 8.

More particularly, the first control element 8 includes a sleeve portion 8A defining a connected portion 13 having serially arranged projections and recesses through peripheries thereof. The lever portion 11A of the second control element 11 includes a connecting element 15 switchable between a position engaged with the connected portion 13 and a position disengaged from the connected portion 13, and a pressing type knob 16 for placing the connecting element 15 in the engaged position. In order to determine the reference braking force, it is sufficient to oscillate the second control element 11 while pressing the knob 16.

The reel further includes a helical groove shaft 17 defining an endless helical groove 17A, and a transmission element 18 fitted on the helical groove shaft 17 thereby to form an oscillating mechanism for moving the spool shaft 6 in a fore and aft direction. A spring linear element 19 is mounted between the first pressure element 9 rotatable in unison with the first control element 8 and the reel body 2 for producing click sounds. Between the second control element 11 and the reel body 2 is mounted a spring plate 20 for producing click sounds and a detent element 21 for maintaining the spring plate 20 in a neutral position.

Other embodiments will be set forth below.

Figure 4:
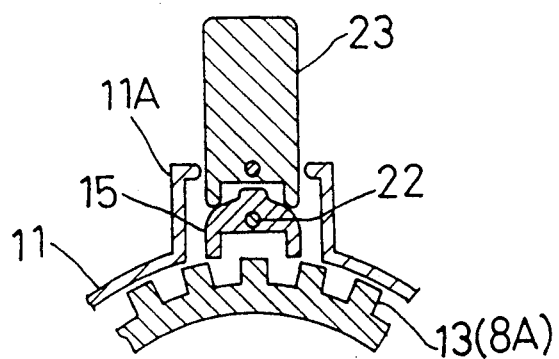
FIGS. 4 and 5 are fragmentary vertical sections showing a structure and a function of the connecting element according to another embodiment.
Figure 5:
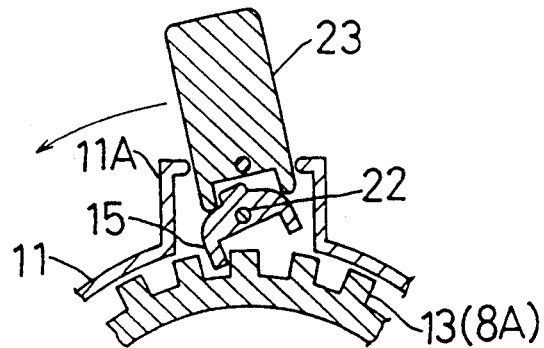

Referring to FIGS. 4 and 5, the connecting element 15 may be operable in various ways apart from the foregoing embodiment. For example, the connecting element 15 may be pivotable relative to the second control element 11 about a support shaft 22 parallel to an axis of the spool shaft 6 while a control element 23 may be provided to contact and thus oscillate the connecting element 15.

According to the present invention, the connected portion and the connecting element may be frictionally engaged with each other, which may be applied to various fishing reels, e.g. a fishing reel including a drag mechanism having a single group of disks.

What is claimed is:

1. A spinning reel comprising:

a reel body;

a spool mounted forwardly of the reel body;

a drag mechanism mounted on a rear end portion of the reel body for applying a braking force to rotation of a spool shaft connected to the spool, said drag mechanism including a first group of discs and a second group of discs;

means for adjusting the braking force of the drag mechanism, said adjusting means having a first control element for determining a reference braking force by adjusting an urging force provided by an urging means to said first group of discs and a second control element for varying the braking force by adjusting said urging force to said second group of discs, said first and second control element being disposed adjacent each other at a rear end of said reel body;

said first control element fixed to a first pressure element of said drag mechanism to be rotatable therewith, such that rotation of said first control element causes said first pressure element to adjust said urging force thereby to adjust said braking force, said first control element including a sleeve portion defining a connected portion at an outer periphery thereof, said connected portion having peripheral serially arranged projections and recesses;

said second control element having a lever portion pivotable to vary a position of a second pressure element of said drag mechanism thereby to adjust the braking force, said second control element further having a connecting element switchable between a position engageable with said connected portion and a position disengaged from said connected portion; and said connecting element, when engaged with said connected portion, causing said first control element and said second control element to be united and rotatable together for adjusting said reference braking force.

2. A spinning reel as claimed in claim 1 wherein, said first control element has a cap-like shape which is screwed to a threaded portion defined in the reel body, said first control element being screwable to a defined limit of a stroke axially along the spool shaft.

3. A spinning reel as claimed in claim 1 wherein, said lever portion is pivotable about a neutral position in opposite directions approximately by 90°.

4. A spinning reel as claimed in claim 3 wherein, said lever portion of the second control element has a pressing type knob for placing the connecting element in the position engaged with the connected portion.

5. A spinning reel as claimed in claim 1 wherein, said connecting element is pivotable relative to the second control element about a support shaft said support shaft being parallel to an axis of the spool shaft.

6. A spinning reel as claimed in claim 5 further comprising control means to contact and thus oscillate the connecting element.

7. A spinning reel as defined in claim 1, wherein said urging means is a spring.

* * * * *